United States Patent [19]
Kohno et al.

[11] Patent Number: 5,195,431
[45] Date of Patent: Mar. 23, 1993

[54] SHUTTER-TYPE CLAMPING DEVICE

[75] Inventors: Yasuyuki Kohno; Mitso Suzuki, both of Chiba, Japan

[73] Assignee: Sumitomo Heavy Industries, Ltd., Tokyo, Japan

[21] Appl. No.: 772,292

[22] Filed: Oct. 7, 1991

[30] Foreign Application Priority Data
Oct. 8, 1990 [JP] Japan .................. 2-270265

[51] Int. Cl.$^5$ .............................................. B03B 1/00
[52] U.S. Cl. .................................. 100/214; 425/450.1; 425/451.9
[58] Field of Search ............ 425/589, 592, 595, 450.1, 425/451.9; 100/214, 271

[56] References Cited
U.S. PATENT DOCUMENTS
3,737,278 6/1973 Putzler ................ 425/450

FOREIGN PATENT DOCUMENTS
359228 10/1980 Austria .
0139771 5/1985 European Pat. Off. .
2151975 7/1985 United Kingdom .

Primary Examiner—Bernard Nozick
Attorney, Agent, or Firm—Nikaido, Marmelstein, Murray & Oram

[57] ABSTRACT

Disclosed is a shutter-type clamping device which is equipped with: a stationary platen; a movable platen; a base plate; a clamping piston which is lodged in a cylinder provided on the base plate and which has a hollow section; a protrusion provided on the movable platen and having configuration which allows it to enter the hollow section of the piston; and a shutter which allows or hinders the entry of the protrusion into the hollow section; the shutter being attached to the piston and arranged in such a manner as to be capable of moving forwards and backwards and incapable of rotating with respect to a member on the side of the base plate.

6 Claims, 5 Drawing Sheets

SHUTTER-TYPE CLAMPING DEVICE

BACKGROUND OF THE INVENTION

1. Field of the Invention

This invention relates to a so-called shutter-type clamping device.

2. Description of the Related Art

FIGS. 5 and 6 shows a conventional shutter-type clamping device for use in an injection molding machine or the like (U.S. Pat. No. 4,201,553).

The device shown includes a stationary platen 2, a movable platen 4, a base plate 6, tie bars 8A through 8D, and molds 10A and 10B respectively attached to the stationary and movable platens 2 and 4.

Provided on the base plate 6 is a clamping piston 12 having a hollow section 12A. The reference numeral 14 indicates a cylinder firmly attached to the base plate 6, and, the reference numeral 16 indicates a flange provided at the opening of the cylinder 14.

Provided on the movable platen 4 is a protrusion 18, which is composed of a nut 18A and a screw bolt 18B. This protrusion 18 has the function of adjusting the mold thickness by varying the length of that section thereof in which the nut and the screw bolt are engaged with each other, and is formed as a cylinder whose size is such that it can enter the hollow section 12A of the piston 12 mentioned above.

Provided between the piston 12 and the protrusion 18 is a shutter 20, by means of which the end opening of the hollow section 12A can be closed. This shutter 20 is arranged in such a manner as to be slidable along the tie bar 8A and as to be able to appropriately follow the axial movement of the piston 12 by means of a shutter gap adjustment mechanism 22.

As shown in FIG. 6, this shutter 20 consists of a swing arm 20B adapted to swing around the tie bar 8A, and a shutter body 20A attached to this swing arm, with the hollow section 12A of the piston 12 being opened and closed by a cylinder 28.

The reference numeral 26 indicates a moving cylinder for opening and closing the movable platen 4.

This conventional shutter-type clamping device, constructed as described above, closes the shutter 20 when performing clamping, transmitting the pressing force of the clamping piston 12 to the movable platen 4 through the protrusion 18. When opening or closing the movable platen 4, the shutter 20 is opened, whereby the protrusion 18 of the movable plate 4 is allowed to enter the hollow section 12A of the piston 12, so that the movable platen 4 can retreat.

In this conventional shutter-type clamping device, however, the shutter 20, or the cylinder 28 for driving the same, is attached to the tie bar 8A or 8D, so that the shutter 20, the cylinder 28, which drives it, and the piston 12 make separate movements, resulting in an unstable shutter operation, which has a bad influence on the mounting quality of the members connecting the shutter 20 and the shutter driving cylinder 28 with each other.

In this conventional example, shown in FIGS. 5 and 6, the above-mentioned trouble is mitigated to some degree by the provision of the shutter gap adjustment mechanism 22, which, however, is liable to make the device construction rather complicated, resulting in a low level of operational efficiency in the assembly and replacement of the members related to the shutter and, consequently, in high costs. Further, despite the presence of this shutter gap adjustment mechanism 22, etc., it has been difficult to maintain a sufficiently high level of operational safety with respect to the shutter opening/closing operation.

SUMMARY OF THE INVENTION

This invention has been made in view of the above-mentioned problems in the prior art. It is accordingly an object of this invention to provide a shutter-type clamping device which helps to improve the shutter opening/closing operation in terms of safety and attain a high level of operational efficiency in the assembly and replacement of the members related to the shutter, thereby making it possible to reduce parts cost and realize a quality clamping device.

To achieve this object, the present invention provides a shutter-type clamping device comprising a stationary platen; a movable platen; a base plate; a clamping piston which is lodged in a cylinder provided on the base plate and which has a hollow section; a protrusion provided on the movable platen and having configuration which allows it to enter the hollow section of the piston; and a shutter which allows or hinders the entry of the protrusion into the above-mentioned hollow section; the shutter being attached to the above-mentioned piston and arranged in such a manner as to be capable of moving forwards and backwards and incapable of rotating with respect to a member on the side of the base plate.

In accordance with this invention, the shutter is not attached to the tie bar, etc. but to the piston itself. Further, the shutter is arranged in such a manner as to be capable of moving forwards and backwards and incapable of rotating with respect to a member on the side of the base plate, for example, the cylinder firmly attached to the base plate.

As a result, when the piston moves in the longitudinal (axial) direction, the shutter always moves with it in the same direction, enabling the end opening of the hollow section of the piston to be always opened or closed with a high level of precision. Further, since this shutter is arranged in such a manner as to be capable of moving forwards and backwards and incapable of rotating with respect to a member on the side of the base plate, it can smoothly follow the forward or backward movement of the piston and, at the same time, is prevented from rotating with the piston, thus making it possible to perform clamping in a very stable manner.

DESCRIPTION OF THE PREFERRED EMBODIMENTS

Embodiments of this invention will now be described in detail with reference to the accompanying drawings.

Figure 1:
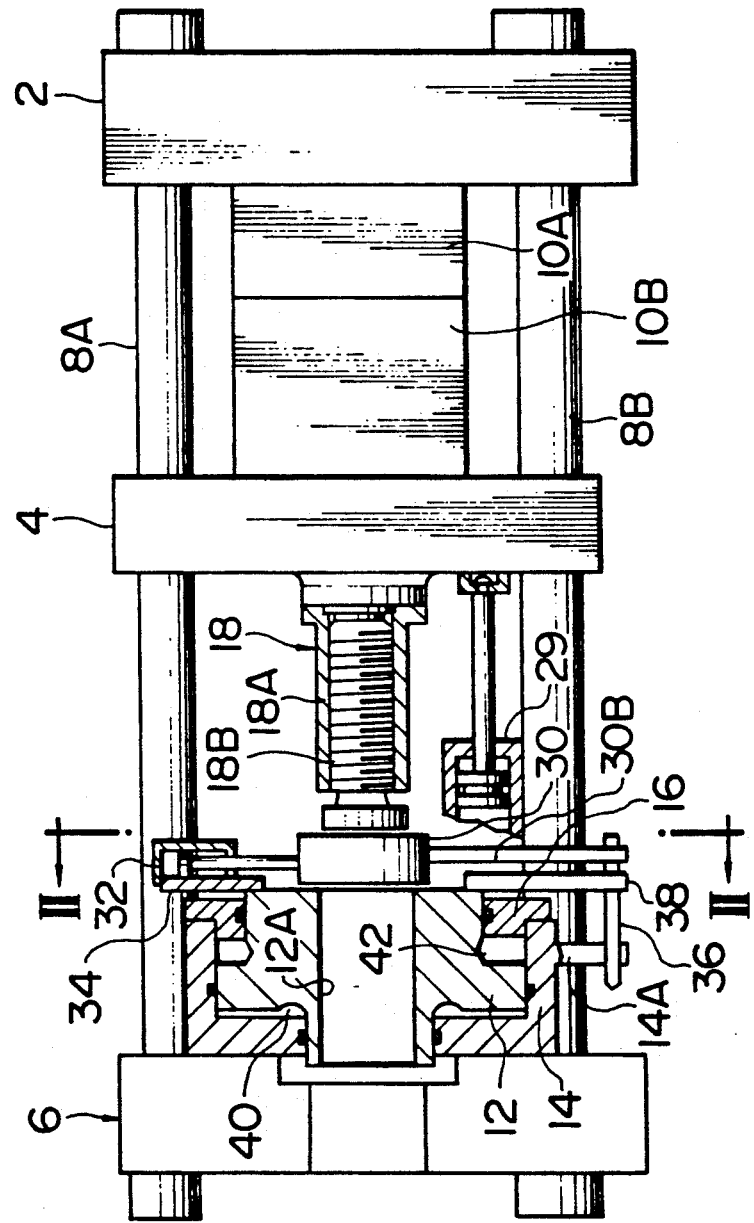
FIG. 1 is a front elevational view of a clamping device for injection molding machines to which the present invention is applied.
Figure 2:
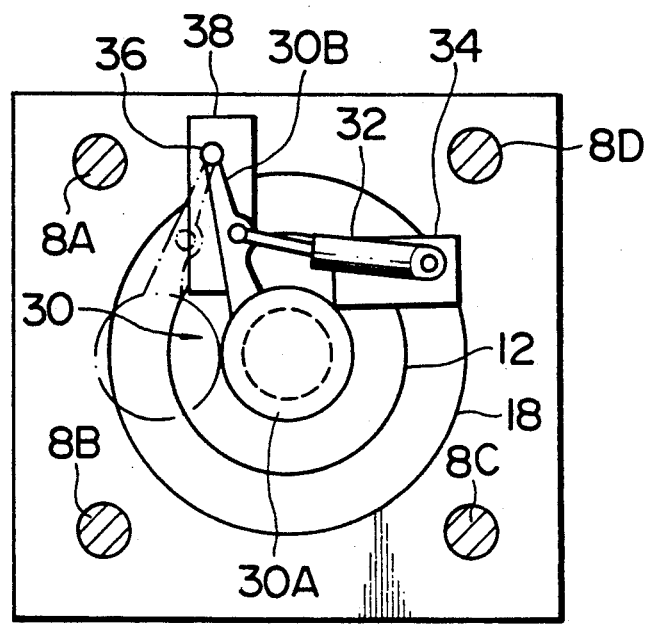
FIG. 2 is a sectional view taken along the line II—II of FIG. 1.

FIGS. 1 and 2 show a shutter-type clamping device in accordance with an embodiment of this invention. In the drawings, the components which are the same as or analogous to those of the above-described conventional example are indicated by the same reference numerals.

Regarding the stationary platen 2, the movable platen 4, the base plate 6, the clamping piston 12, the protrusion 18, etc., there is nothing particularly different from the equivalents of the conventional example.

In this embodiment, however, the shutter 30 and the cylinder 32 for opening and closing the same are attached to the piston 12 through the intermediation of a guide plate 34.

The shutter 30 is mainly composed of a shutter body 30A and a swing arm 30B. The swing arm 30B is rotatably supported by a shaft 36, around which it can make a swinging movement.

The shaft 36 is attached to the piston 12 through the intermediation of a guide plate 38. The other end of this shaft 36 can slide in the axial direction by means of a guide 14A protruding from the clamping cylinder 14 and, at the same time, the shutter 30 and the cylinder 32 for driving the same are prevented from rotating with the piston 12.

As in the above-described conventional example, the mold thickness adjustment in this embodiment is effected by means of the protrusion 18. This protrusion 18 consists of a nut 18A and a screw bolt 18B, and the length of that portion of the screw bolt 18B protruding from the nut 18A is variable, whereby the mold thickness can be adjusted.

Next, the operation of the device of this embodiment will be described.

When the movable platen 4 is operated to effect an opening/closing movement, the shutter drive cylinder 32 is driven to swing the shutter 30 as indicated by the dashed line of FIG. 2, thereby opening the hollow section 12A of the piston 12, so that the protrusion 18, which also serves as the mold thickness adjusting mechanism, can enter the hollow section 12A of the clamping piston 12. As a result, the movable platen 4 can be freely moved in the longitudinal direction by driving a moving cylinder 29.

At this operational stage, the clamping piston 12 is at the left-hand (retreated) position as seen in the drawing.

When performing clamping, the movable platen 4 is moved in the above-described state until the mold surfaces meet each other. Then, the shutter drive cylinder 32 makes a closing movement, bringing the shutter 30 to a position between the screw bolt 18B of the protrusion 18 and the hollow section 12A of the piston 12 (i.e., the position indicated by the solid line of FIG. 2). Afterwards, pressure oil is fed into a rear oil chamber 40 of the clamping cylinder 14, and the oil in a front oil chamber 42 is discharged to a tank, thereby causing the piston 12 to move forwards to be pressed against the protrusion 18 of the movable platen 4 through the shutter 30.

In this process, the clamping piston 12 makes a forward or a backward movement in accordance with the clamping or the mold opening/closing movement. Since the shutter 30 and the shutter drive cylinder 32 are attached to the piston 12, the shutter 30 and the piston 12 are always united in their forward and backward movements, so that there is no risk of the shutter 30 and the piston 12 interfering with each other or of an excessive gap being generated, thus making it possible to perform shutter operation always in a smooth manner.

Further, since it is not only the shutter 30 but also the shutter drive cylinder 32 that is attached to the piston 12, the shutter and the members related thereto are independent of the other parts such as the tie bars, whereby the operational efficiency in the replacement or mounting of the shutter is greatly improved.

In addition, no mechanism for shutter gap adjustment, which has been indispensable to the conventional shutter-type clamping device, is required any more, which leads to a simpler structure, thereby making it possible to attain a reduction in costs and an improvement in product quality.

Figure 4:
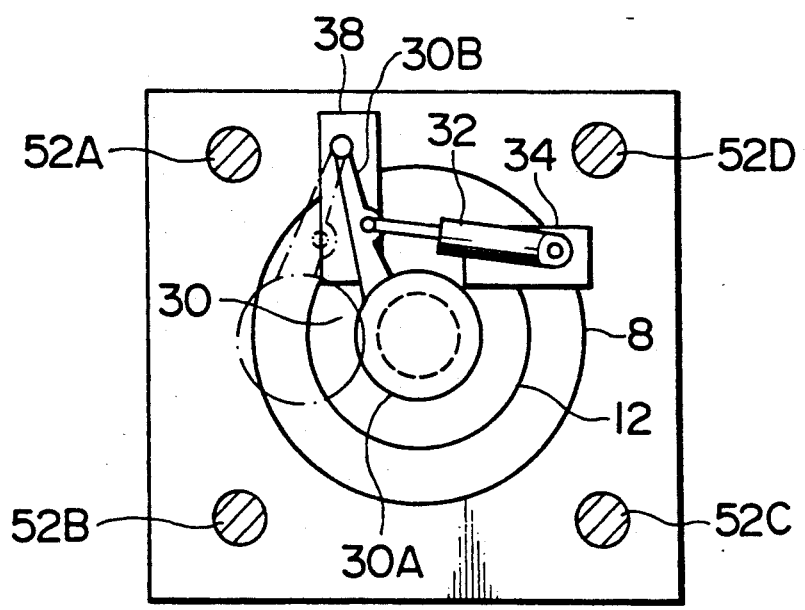
FIG. 4 is a sectional view taken along the line IV—IV of FIG. 3.
Figure 3:
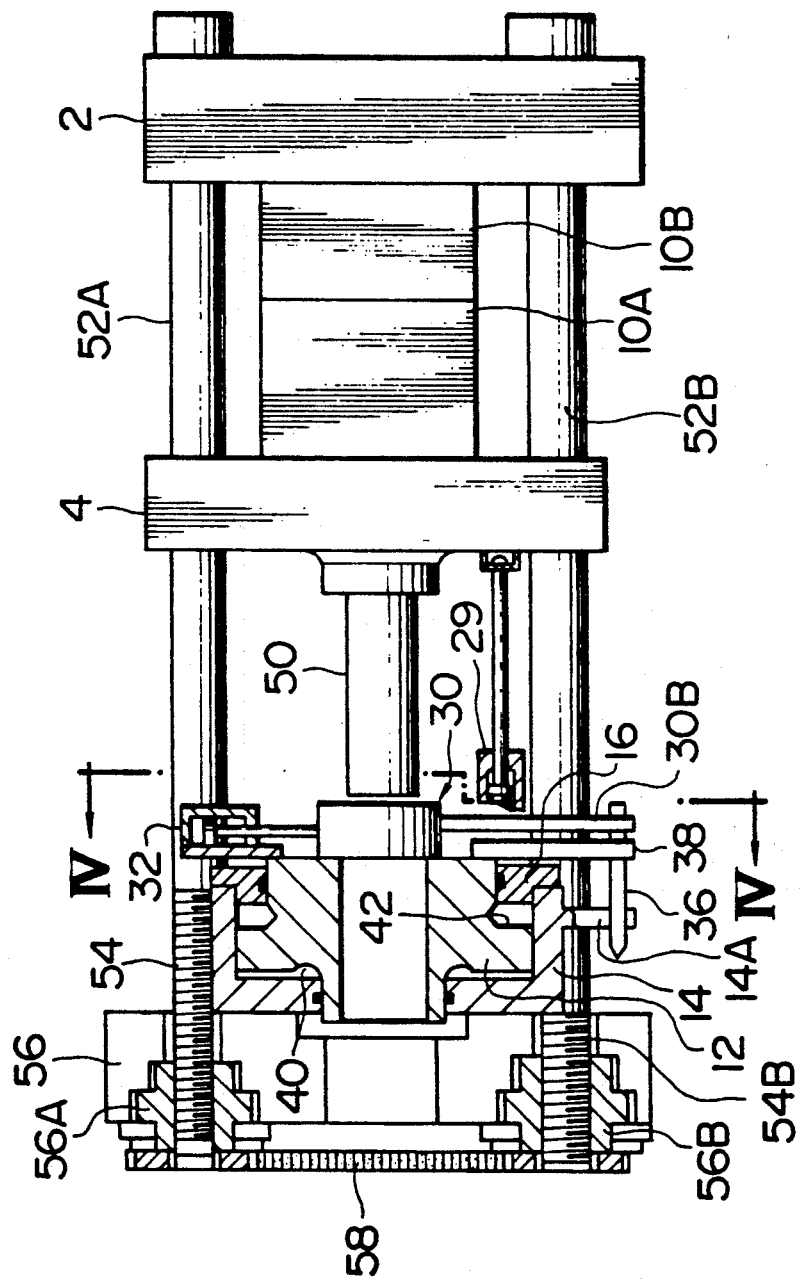
FIG. 3 is a front elevational view equivalent to FIG. 1, showing another embodiment of this invention.
Figure 5:
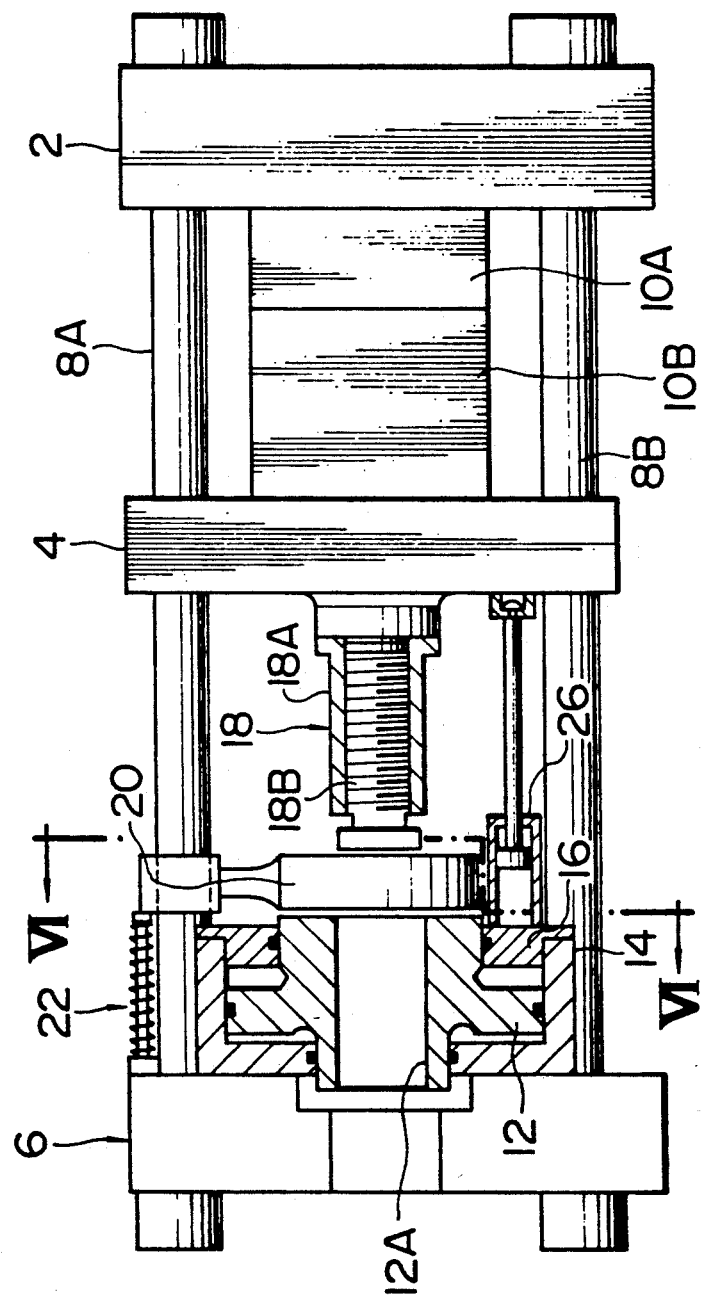
FIG. 5 is a front elevational view equivalent to FIG. 1, showing an example of a conventional clamping device.
Figure 6:
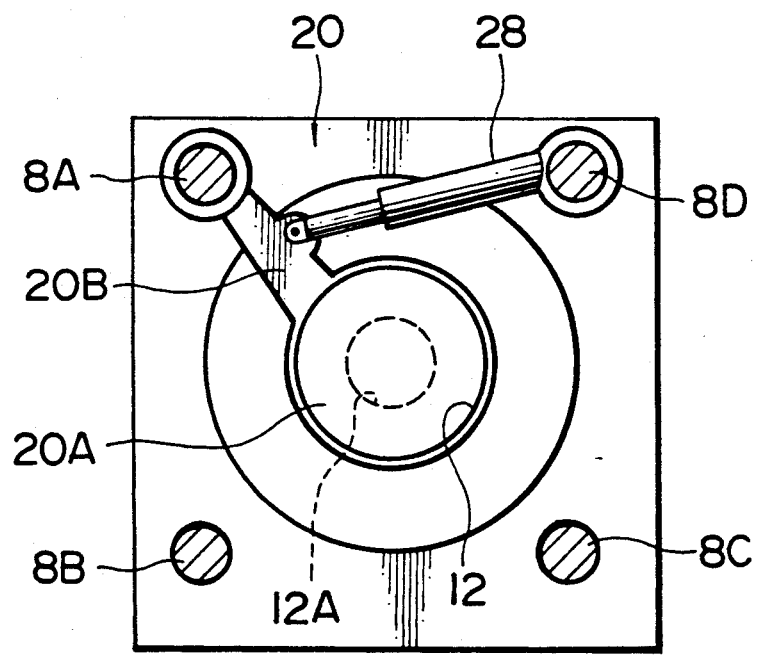
FIG. 6 is a sectional view taken along the line VI—VI of FIG. 5.

FIGS. 3 and 4 show another embodiment of this invention.

In this embodiment, the above-mentioned protrusion 18 is formed simply as a solid protrusion 50, with the mold thickness adjustment mechanism being provided as a separate component.

In the mold thickness adjustment mechanism of this embodiment, screw sections 54A through 54D are provided at the ends of the tie bars 52A through 52D. Tie bar nuts 56A through 56D are engaged with these screw sections 54A through 54D, and, by turning these tie bar nuts 56A through 56D, the longitudinal position of the base plate 56 with respect to the tie bars 52A through 52D is adjusted. These tie bar nuts 56A through 56D are rotatably supported by the base plate 56. Further, the tie bar nuts 56A through 56D are connected with each other through a timing belt 58 (or gears or the like), so that, by means of a single motor (not shown), all the tie bar nuts 56A through 56D can be simultaneously rotated in the same direction and by the same amount.

Regarding the other structural features of this embodiment, they are completely the same as those of the embodiment shown in FIGS. 1 and 2, so that the same components are indicated by the same reference numerals and a description thereof will be omitted here.

While in the above embodiments the shutter 30 are attached to the clamping piston 12 through the intermediation of the guide plate 38, this guide plate 38 is not an indispensable component and the shutter 30 may be directly attached to the piston 12.

Further, while in the above embodiments the shutter drive cylinder 32 is also attached to the piston 12 through the intermediation of the guide plate 34, this guide plate 34 is not indispensable, either; the cylinder 32 may be directly attached to the piston 12.

Further, while in the above embodiments the guide plates 34 and 38 are formed as separate components, it is also possible for them to constitute one component.

Further, while in the above embodiments the shutter is of a swing type, it may also be of a linearreciprocation type. In that case, it is possible to provide a plate having a guide section for supporting the shutter in such a manner as to allow it to make a linear reciprocating movement. Alternatively, only the guide may be directly attached to the piston.

Thus, what is essential is that the shutter and the drive mechanism thereof be directly or indirectly attached to the piston in such a manner as to be united with the piston in terms of movement, and that some means be provided which prevents the piston and the shutter mechanism from rotating with respect to the clamping cylinder.

What is claimed is:

1. A shutter-type clamping device comprising:
    a stationary platen;
    a movable platen;
    a base plate;
    support means for supporting said stationary platen, said movable platen, and said base plate in an aligned relationship;
    a clamping piston;
    drive cylinder means connected to said base plate, for selectively driving said clamping piston toward and away from said movable platen;
    said clamping piston being connected to said drive cylinder means supported by said base plate and having a hollow section;
    a protrusion connected to said movable platen, said protrusion entering said hollow section of said clamping piston when said clamping piston is driven toward said movable platen when said hollow section of said clamping piston is open;
    a shutter connected to said clamping piston for movement therewith, and which is selectively movable into and out of a blocking position which blocks entry of said protrusion into said hollow section when said clamping piston is driven toward said movable platen; said shutter being movably mounted to said clamping piston; and
    drive means for moving said shutter into and out of the blocking position; whereby said protrusion is clamped when said clamping piston is driven toward said movable platen when said hollow section of said clamping piston is closed by said shutter.

2. A clamping device as claimed in claim 1, further comprising a shaft connected to said clamping piston and a guide connected to said drive cylinder means, wherein said shutter is pivotably supported by one end of said shaft for movement in a plane which is substantially parallel to a face of said clamping piston, the other end of said shaft being supported in a bore disposed in said guide, said guide protruding from the outer periphery of said drive cylinder means so as to be slidable in an axial direction.

3. A clamping device as claimed in claim 1, wherein said protrusion comprises a screw bolt and a nut, for adjustment of a length of protrusion toward said base plate from said movable platen, thereby enabling adjustment of mold thickness.

4. A clamping device as claimed in claim 1, further comprising an adjustment mechanism for adjusting the position of said base plate relative to said movable platen.

5. A clamping device as claimed in claim 4, wherein said adjustment mechanism comprises a plurality of screw sections on said support means and a plurality of tie bar nuts which are in engagement with respective ones of said plurality of screw sections.

6. A clamping device as claimed in claim 5, wherein said adjustment mechanism further comprises a timing means which is drivable for simultaneously driving all of said tie bar nuts.

* * * * *